United States Patent [19]

Kubota et al.

[11] Patent Number: 4,872,131

[45] Date of Patent: Oct. 3, 1989

[54] ARITHMETIC-LOGIC OPERATION UNIT HAVING HIGH-ORDER AND LOW-ORDER PROCESSING SECTIONS AND SELECTORS FOR CONTROL OF CARRY FLAG TRANSFER THEREBETWEEN

[75] Inventors: Kazumi Kubota, Nerima; Kazushi Kobayashi; Toshihiko Ogura, both of Ebina, all of Japan

[73] Assignee: Hitachi, Ltd., Tokyo, Japan

[21] Appl. No.: 192,547

[22] Filed: May 11, 1988

[30] Foreign Application Priority Data

May 11, 1987 [JP] Japan .................................. 62-112353

[51] Int. Cl.⁴ .................................................. G06F 7/00
[52] U.S. Cl. .................................................... 364/736
[58] Field of Search ........................ 364/736, 748, 749

[56] References Cited

U.S. PATENT DOCUMENTS

| | | | |
|---|---|---|---|
| 4,384,340 | 5/1983 | Tague et al. | 364/736 |
| 4,694,416 | 9/1987 | Wheeler et al. | 364/736 |
| 4,768,160 | 8/1988 | Yokoyama | 364/745 |

FOREIGN PATENT DOCUMENTS 58-207177  12/1983  Japan .................................... 364/736

Primary Examiner—Gary V. Harkcom
Assistant Examiner—Tan V. Mai
Attorney, Agent, or Firm—Antonelli, Terry & Wands

[57] ABSTRACT

Two arithmetic logic units (ALUs) are provided, one a high-order side and another on a low-order side such that data on the high-order side and on low-order side, output from each of a source data register and a destination data register, are respectively supplied to the ALUs to be operated on thereby. There is provided a selector circuit on the output side of the source data register, which selector circuit operates to deliver the data on the high-order side and that on the low-order side from the source data register selectively to the ALU on the high-order side and that on the low-order side according to the operating mode. Carry outputs from each of the ALUs are input to a first selector and one is selected according to the operating mode and stored in a carry flag register. The output of the carry flag register and the carry output of the ALU on the low-order side are input to a second selector whereby one output thereof is selected according to the operating mode and input to the ALU on the high-order side as the carry input thereto, and also, the output of the carry flag register is supplied to the ALU on the low-order side as the carry input thereto.

7 Claims, 4 Drawing Sheets

ARITHMETIC-LOGIC OPERATION UNIT HAVING HIGH-ORDER AND LOW-ORDER PROCESSING SECTIONS AND SELECTORS FOR CONTROL OF CARRY FLAG TRANSFER THEREBETWEEN

BACKGROUND OF THE INVENTION

The present invention relates to a processing unit of a computer and more particularly to an arithmetic-logic operation unit suitable for use in logic and arithmetic operations between data of one unit word length and between data of two unit word lengths.

In a prior art arithmetic-logic operation unit, as described in MOTOROLA's "MC68020 32-Bit Microprocessor User's Manual", Second Edition, PP. 1.3 to 2.1, there are provided an arithmetic logic unit of the word-length width required for processing data exceeding to unit word lengths, for example, that for processing data of two unit word lengths and registers for storing input data to and output data from the arithmetic logic unit. When data of smaller word length than the word length which the arithmetic logic unit is capable of processing is processed thereby, only the low-order side of the output data from the output of the arithmetic logic unit is stored in the register.

Thus, there has been a problem that, when data of half the storable word length of the register or less are processed, the storable word length of the register has not been effectively utilized, although it is capable of storing two data or more.

SUMMARY OF THE INVENTION

An object of the present invention is to provide an arithmetic-logic operation unit which enables effective utilization of its registers when it processes data whose word lengths are a half or less of that which can be processed by its arithmetic logic unit and general-purpose registers.

Another object of the present invention is to provide an arithmetic-logic operation unit which enables operational processing of data of different word lengths, such as those of 16 bits and 32 bits.

A further object of the present invention is to provide an arithmetic logic unit which enables high-speed operational processing of data by simultaneously performing different operational processes in parallel for a high-order side and a low-order side of the data to be operated on.

In order to achieve the above enumerated objects, the present invention provides an arithmetic-logic operation unit comprising a register portion made up of a plurality of registers for storing data to be operated on, a processing portion for processing the data to be operated on as supplied from the register portion, each being divided into at least two sections, i.e., high-order side and low-order side, and switching means disposed in the paths through which the data is supplied from the register portion to the processing portion for distributing the high-order portion and the low-order portion of the data in one way or the other.

And, in the arithmetic-logic operation unit of the present invention, each of the divided sections of the processing portion is provided with a path through which carry information is input thereto, a path through which newly generated carry information as the result of its operation is output therefrom, and at least one carry flag register for storing carry information and supplying it as the carry information for the divided section of the processing portion.

Thereby, the arithmetic-logic operation unit of the present invention performs its operation, in a first mode, such that the input to the carry flag register is delivered from the output path of the carry information of the highest-order division of the processing portion, and the output from the carry flag register is supplied to the input path of the carry information of the lowest-order division of the processing portion, and other carry information than that output from the highest-order division of the processing portion and input to the lowest-order division of the processing portion is output from the lower-order divisions and input to the following higher-order divisions of the processing portion.

The arithmetic-logic operation unit of the present invention performs its operation, in a second mode, such that the output of the carry flag register is supplied to a selected section of the divided processing portion as the carry information input thereto, while the input to the carry flag register is supplied from the carry information output of the selected division of the processing portion, and necessary portions of the data are selectively extracted from outputs of the register portion by means of a switching device and supplied to the selected division of the processing portion.

That is, in accordance with the present invention, with each of the arithmetic logic unit and the register preferably divided into a high-order side and a low order side, operations are performed, in the normal case, such that the arithmetic logic unit on the high-order side and the arithmetic logic unit on the low-order side are joined together, while, in the case where only the high-order side or the low-order side is used, only the arithmetic logic unit on the corresponding side is used. Further, with a selector circuit capable of interchanging data on the high-order side and data on the low-order side provided in the path through which input data to the arithmetic logic unit are supplied from the register, control is provided such that, in the cases where operations are performed between the contents on the high-order side, or between the contents on the low-order side, of both the registers, and where operations are performed using the high-order side and the low-order side of the arithmetic logic unit joined together, the interchanging is not performed by the selector circuit, whereas in the case where operations are performed between the contents on the high-order side and the contents on the low-order side of the respective registers, the high-order side and the low-order side of the input data are interchanged by the selector circuit.

In the above described organization of the present invention, each of the arithmetic logic units divided to the high-order side and the low-order side performs an operational process as a single unit. For detection of the generated carry at the time the operation is performed only in the high-order side or the low-order side, the carry flag register indicating the generation of the carry is selectively supplied with a carry signal from the high order side or the low-order side of the arithmetic logic unit. More specifically, in the cases where the operation is made using both the high-order side and the low-order side of the arithmetic logic unit joined together or the operation is made using only the high-order side of the arithmetic logic unit, the carry signal of the arithmetic logic unit on the high-order side is caused to be input to the carry flag register, whereas in the case where the operation is made only using the arithmetic logic unit on the low-order side, the carry signal of the arithmetic logic unit on the low-order side is caused to be input to the carry flag register. The output of the carry flag register is input to the low-order side of the arithmetic logic unit and to a carry input selector for selecting the carry input to the high-order side of the arithmetic logic unit. The carry input selector receives as inputs thereto the output of the carry flag register and the carry signal of the low-order side of the arithmetic logic unit, and delivers the carry signal of the low-order side of the arithmetic logic unit to the high-order side of the arithmetic logic unit as the carry input thereto when the high-order side and the low-order side of the arithmetic logic unit are conjointly used for operation, but otherwise delivers the output signal from the carry flag register to the high-order side of the arithmetic logic unit as the carry input thereto.

The selector circuit has a function to interchange the high-order side and the low-order side of the output signal as the source data of the output signals from the registers input to the arithmetic logic unit. Generally, the arithmetic logic unit specifies the register (source data register) for source data and the register (the destination data register) for destination data and performs operations on the output signals from these registers received thereby as inputs thereto, and thereupon, stores the result of the operation in the register which has been specified as that for the destination data. Therefore, in both the cases where operations are made only on the high-order side, or only on the low-order side, of the output of the register as the destination data, and where the operation is made with the high-order side and the low-order side conjoined, there is caused no reversal of the relation between the high-order side and the low-order side between the input to the arithmetic logic unit and the output therefrom.

Conversely, in the cases where operations are made between the high-order side of the source data and the low-order side of the destination data and where operations are made between the low-order side of the source data and the high-order side of the destination data, the relation between the high-order side and the low-order side must be reversed between the output of the register as the source data and the output of the arithmetic logic unit. The selector circuit performs such reversal processing between the high-order side and the low-order side in the source data. As a result, when operations are made between the high-order side of the destination data and the low-order side of the source data, the high-order side of the output of the register as the destination data and the low-order side of the output of the register as the source data are input to the arithmetic logic unit on the high-order side and the result of the operation output from the arithmetic logic unit on the high-order side is input to the high-order side of the register for the destination data. And, when operations are made between the low-order side of the destination data and the high-order side of the source data, the low-order side of the output of the register as the destination data and the high-order side of the output of the register as the source data are input to the arithmetic logic unit on the low-order side, and the result of the operation output from the arithmetic logic unit on the low-order side is input to the low-order side of the register for the destination data.

In the operating modes of the organization of the present invention as described above, operations between combinations of the high-order side and low-order side of the source data and the high-order side and low-order side of the destination data can be achieved.

DETAILED DESCRIPTION OF THE PREFERRED EMBODIMENTS

Figure 1:
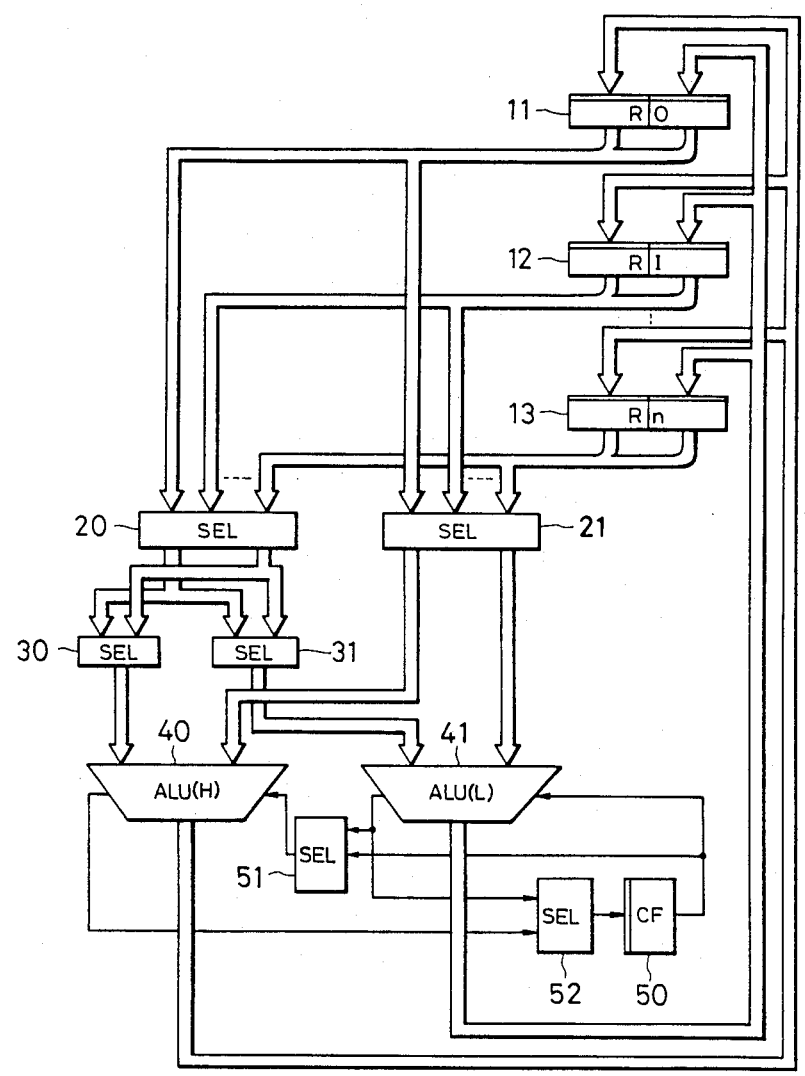
FIG. 1 is a block diagram showing an embodiment of an arithmetic-logic operation unit according to the present invention.

An embodiment of the present invention will be described below in detail with reference to the accompanying drawings. FIG. 1 shows a block diagram of an embodiment of the present invention, wherein 11, 12, 13 denote registers for storing input data to be operated on and results of operations on that data. Selector 20 selects as source data one of the outputs of the registers 11 to 13. Selector 21 selects as destination data one of the outputs of the registers 11 to 13. Selectors 30, 31 interchange high-order side and low-order side portions of the source data selected by the selector 20. Reference numerals 40 and 41 denote arithmetic logic units (ALU) on the high-order side and the low-order side, respectively. Reference numeral 50 denotes a carry flag register, 51 denotes a selector for switching the carry input to the ALU 40 on the high-order side. Reference numeral 52 denotes a selector for switching the input to the carry flag register 50 between that output from the ALU 40 on the high-order side and that output from the ALU 41 on the low-order side.

Although only three registers 11 to 13 are shown in FIG. 1, the following explanation holds good even if the number of the registers is different from that. The output signals of the registers 11 to 13 are supplied to the selectors 20 and 21 as inputs thereto. The selector 20, responding to the number indicating specified source data, selects the output data of the corresponding register out of the registers 11–13, whereas the selector 21 similarly selects the output of the register corresponding to the destination data. The output of the selector 20 is divided into the high-order side and low-order side and these are input to the selectors 30 and 31, respectively.

The selector 30 determines the high-order side of the source data to be supplied to the ALU 40 on the high-order side, whereas the selector 31 determines the low-order side of the source data to be supplied to the ALU 41 on the low-order side.

The switching control of the selectors 30 and 31 are performed in the following manner. In the cases where the ALU 40 and ALU 41 are used conjointly and operational processing to the full width of the register is performed and where one of the ALUs 40 and 41 is used, and operations are made between the source data and destination data on the high-order side, or between those data on the low-order side, the selectors 30, 31 allow the high-order side and the low-order side free passage, but otherwise interchange them.

Thereby, when operations are carried out between the low-order side of the destination data and the high-order side of the source data, the selector 31 selects the high-order side of the output data of the selector 20 and supplies it to the ALU 41 on the low-order side as source data therefor. The destination data input of the ALU 41 on the low-order side is fixed to the low-order side of the register output as the destination data, and therefore the result of operation between the low-order side of the destination data and the high-order side of the source data appears at the output of the ALU 41. And, when operations are carried out between the high-order side of the destination data and the low-order side of the source data, the selector 30 selects the low-order side of the output data of the selector 20 and this output and the high-order side of the output of the selector 21 are supplied to the ALU 40 and the result of operation appears at the output of the ALU 40.

For switching the individual and conjoint operating modes of the two ALUs 40 and 41, the input and output control of the carry flag is performed. The carry flag register 50 stores therein the carry detection signal from the ALU 40 on the high-order side or that from the ALU 41 on the low-order side which is selected by the selector 52. The selector 52 selects the carry detection signal from the ALU 41 on the low-order side only when the operation is made using just the ALU 41, but otherwise selects the carry detection signal from the ALU 40 on the high-order side and supplies the signal to the carry flag 50 as input thereto. The output of the carry flag 50 is supplied to the carry input of the ALU 41 on the low-order side and one of the inputs of the selector 51. Through selection of the output of the carry flag register 50 by the selector 51, the ALU 40 on the high-order side alone can be used for operations and the result of the operation is supplied only to the high-order side of the registers 11-13. Through selection of the carry detection signal from the ALU 41 on the low-order side by the selector 51, it is possible to effect a carry from the ALU 41 on the low-order side to the ALU 40 on the high-order side, whereby operations with the ALUs 40 and 41 joined together are made possible.

According to the present embodiment, the register within the arithmetic-logic operation unit can be divided into sections on the high-order side and the low-order side, and in addition thereto, operations between any registers can be made without the need for special care for the sections of the registers on the high-order side and the low-order side. Further, since what are required as the constituents of the embodiment of this invention are the selector for interchanging the high-order side and the low-order side of the source data and the selector for input and output control of the carry flag, the increase in the circuit scale and cost is very small.

Figure 2:
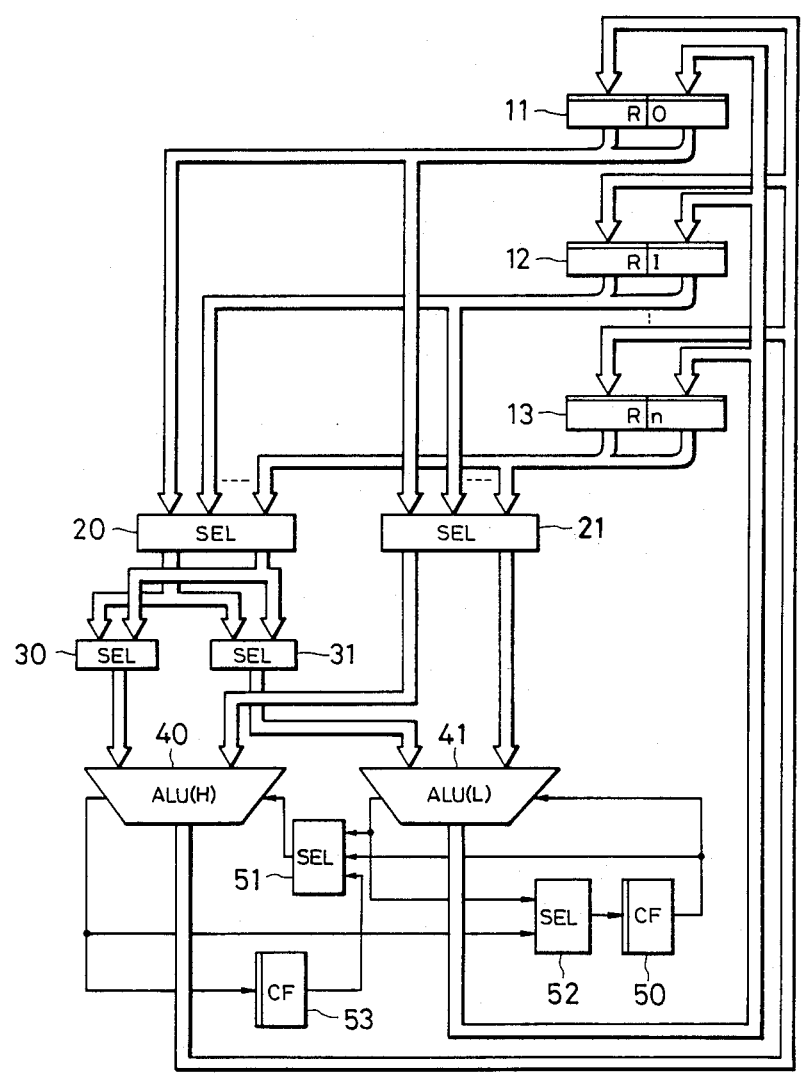
FIG. 2 is a block diagram showing a second embodiment of an arithmetic-logic operation unit according to the present invention.

FIG. 2 is a block diagram showing another embodiment of the present invention, wherein like parts to those shown in FIG. 1 are denoted by corresponding reference numerals. Reference numeral 53 denotes a second carry flag register for storing a detection signal of the carry generated in the ALU 40 on the high-order side.

In the arrangement of the figure, the carry detection signal from the ALU 40 on the high-order side is input to the second carry flag register 53 as well as to the selector 52. And, the output of the second carry flag register 53 is supplied to the selector 51 as the third input thereto. In the present embodiment, by controlling the selector 52 to cause the carry detection signal from the ALU 41 on the low-order side to be input to the carry flag register 50 and controlling the selector 51 to cause the output of the second carry flag register 53 to be delivered to the carry input of the ALU 40 on the high-order side, independent operational processes can be performed in the two ALUs 40 and 41.

In the case of the first embodiment, it is presupposed that the two ALUs 40 and 41 will make the same operation, but in the case of the present embodiment, different operations can be simultaneously performed by means of the second carry flag register 53 as described above. As a result, it becomes possible to have the operational process to be performed on the high-order side of the register and the operational process to be performed on the low-order side executed in parallel and to bring about an advantage that the efficiency in the operational process is enhanced.

Although the embodiments were described above with a barrel shifter circuit, operational masking circuit, shift-rotate circuit, and others that are usually disposed in the periphery of the arithmetic-logic operation unit omitted for the sake of simplicity of description, it is apparent that the effects of the present invention are obtained even if such circuits are provided as usual.

Modes of operations achievable by the organizations of the present invention will be described below taking the cases of 32-bit operation, 16-bit operation, etc. as an example. FIGS. 3A-3D show various modes of operations, wherein the high-order side ALU 40 and the low-order side ALU 41 are each assumed to be of a 16-bit capacity. Referring to the figures, 14, 15 correspond to the registers 11 to 13 in the embodiments of FIGS. 1 and 2, and are a source data register and a destination data register, respectively. And, 22, 23 are selector circuits corresponding to the selectors 20, 30, and 31 and the selector 21 in the above described embodiments. Further, 54, 55 denote carry flag registers and 56 denotes a selector.

Figure 3A:
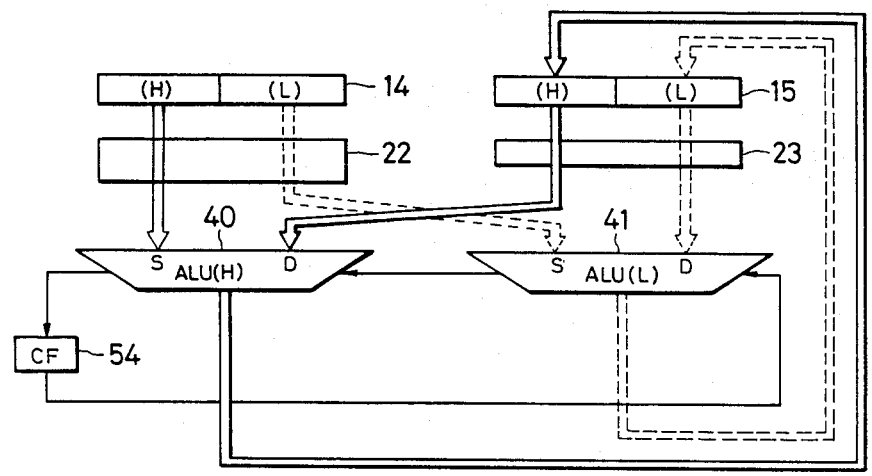
FIGS. 3A to 3D are block diagrams for schematically showing various operating modes in an embodiment of an arithmetic-logic operation unit according to the present invention.

FIG. 3A shows the case where a 32-bit operation is performed, in which the carry of the low-order side ALU 41 becomes the carry input to the high-order side ALU 40, and the carry output of the ALU 40 is stored in the carry flag 54.

Figure 3B:
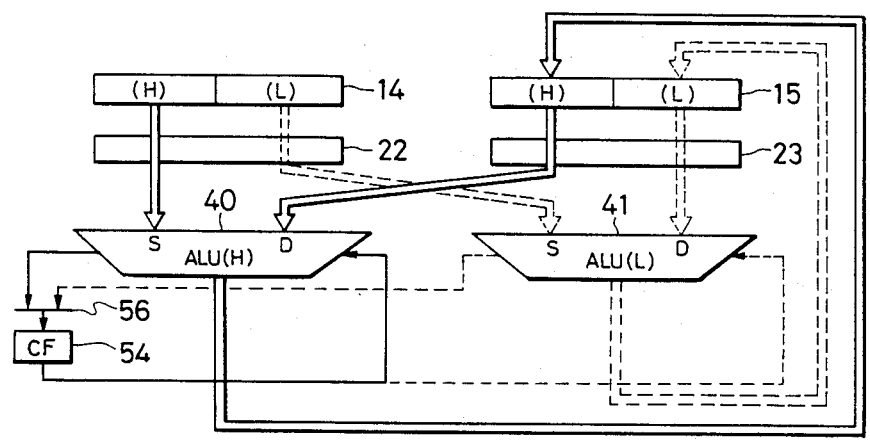

FIG. 3B shows a mode of 16-bit operation, in which when the operation is made on the low-order side of the destination data register 15, the output of the ALU 41 is written to the low-order side of the destination data register 15 as indicated by dotted lines in the figure, whereupon the carry output of the ALU 41 is stored in the carry flag register 54 through the selector 56. But, when the operation is made on the high-order side of the destination data register 15, the output of the ALU 40 is written to the high-order side of the destination data register 15 is shown in solid lines in the figure, whereupon the carrier output of the ALU 40 is stored in the carry flag register 54 through the selector 56.

Figure 3C:
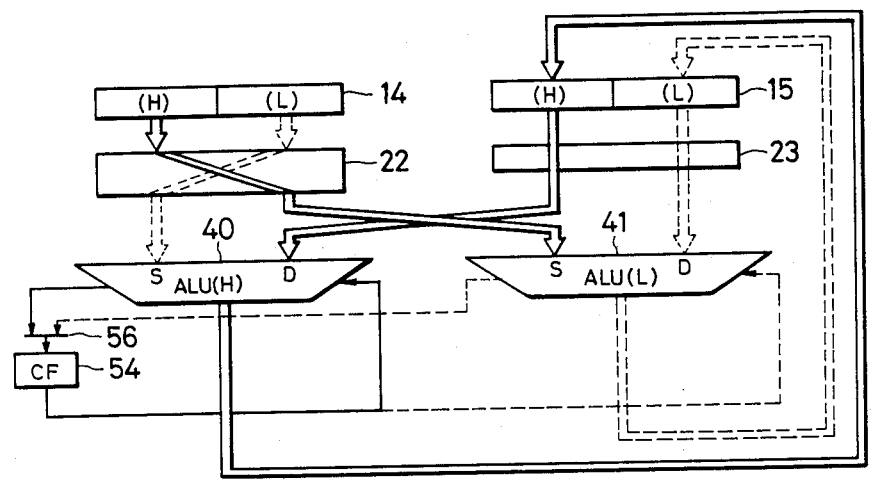

FIG. 3C shows another mode of 16-bit operation, wherein operations are made diagonally between 16-bit data on the high-order side and 16-bit data on the low-order side of the two registers 14, 15. That is, the data on the high-order side and the data on the low-order side of the source data register 14 are swapped over by the selector circuit 22 corresponding to the selectors 20, 30, 31 in the above described embodiments and operated on the data from the destination data register 15. That is, the low-order source data is operated on the high-order destination data in the ALU 40, whereas the high-order source data is operated on the low-order destination data in the ALU 41. The carry output to the carry flag register 54 is switched by the selector 56 the same as in the case of FIG. 3B.

Figure 3D:
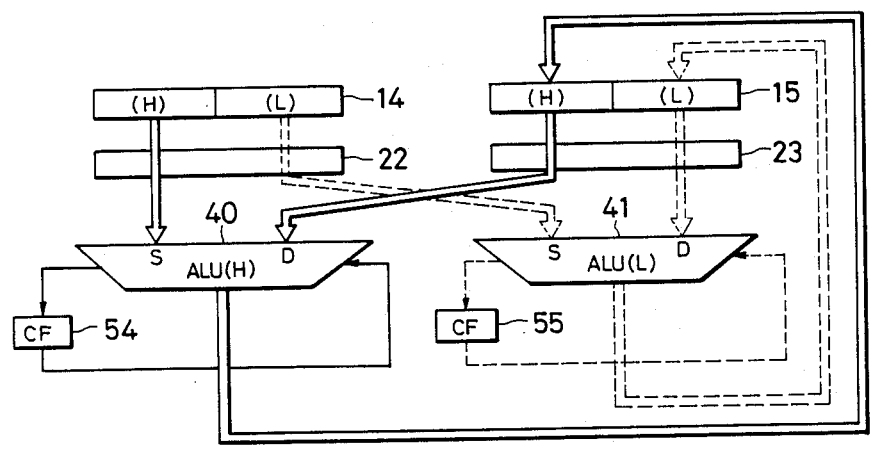

FIG. 3D shows a case where 16-bit parallel operations are performed, wherein the ALU 40 and the ALU 41 each have their own carry flags and performed operations independently of each other.

According to the present invention as described above, sine logic operations are arithmetic operations can be performed by using only high-order side or low-order side of all-purpose registers in an arithmetic-logic operation unit, an advantage is obtained that registers of limited capacity can be effectively utilized when data of small word length is processed. Further, since it becomes possible to simultaneously perform different operations in parallel for the high-order side and the low-order side by adding only a few circuit component parts to the unit, another effect is obtained that the time required for operational processing can be reduced.

What is claimed is:

1. An arithmetic-logic operation unit for operational processing of two data, comprising:
   register means including a plurality of registers for storing data, each of said registers being divided at least into two sections, one section for storing a high-order portion of data and the other section for storing a low-order portion of said data;
   processing means for effecting an operational processing of data supplied from said register means, said processing means including a first processing section for processing a high-order portion of data and a second processing section for processing a low-order portion of said data; and
   switching means connected between said register means and said processing means for interchanging high-order and low-order portions of data supplied to said processing means.

2. An arithmetic-logic operation unit according to claim 1, further comprising:
   a first selector for selecting a carry output from one of said first and second processing sections of said processing means;
   first carry flag register means for retaining the carry output selected by said first selector; and
   a second selector for selecting either a carry output from said second processing section or the output of said carry flag register means, and for supplying the selected output to said first processing section as a carry input thereto.

3. An arithmetic-logic operation unit according to claim 2, further comprising:
   second carry flag register means for retaining a carry output from said first processing section, wherein said second selector is connected to receive and is operable to select the output of said second carry flag register means.

4. An arithmetic logic unit for operation processing of data and for outputting the processed data, comprising:
   register means for storing data;
   processing means for processing data supplied from said register means, said register means being divided into respective sections for storing a high-order portion of data and a low-order portion of said data; and
   switching means connected between said register means and said processing means for interchanging high-order and low-order portions of the data supplied to said processing means.

5. An arithmetic logic unit according to claim 4, wherein said processing means includes a first processing section for processing a high-order portion of data and a second processing section for processing a low-order portion of said data, and further comprising:
   first connection means provided for each of said first and second processing sections of said processing means for inputting carry information thereto;
   second connection means provided for each of said first and second processing sections of said processing means for outputting carry information therefrom, which carry information is newly generated as a result of an operation carried out in said processing means; and
   carry flag register means for storing carry information received from said second connection means and supplying the stored carry information to said first connection means as carry information for said processing means.

6. An arithmetic logic unit according to claim 5, comprising:
   means operating in a first mode for controlling said first and second connection means to supply carry information to said carry flag register means from the second connection means of said first processing section, to supply carry information from the output of said carry flag register means to the first connection means of said second processing section, and to supply carry information from said second connection means of said second processing section to the first connection means of said first processing section.

7. An arithmetic logic unit according to claim 6, comprising:
   means operating in a second mode for controlling said first and second connection means to supply carry information from the output of said carry flag register means to the first connection means of a selected one of said first and second processing sections, to supply carry information to said carry flag register means from the second connection means of the selected one of said first and second processing sections, and to supply a portion of data for operation to the selected one of said first and second processing sections from said register means.

* * * * *